(12) United States Patent
Udagawa et al.

(10) Patent No.: US 6,517,085 B2
(45) Date of Patent: Feb. 11, 2003

(54) CYLINDER HEAD GASKET WITH PARTIAL RESIN COATING

(75) Inventors: Tsunekazu Udagawa, Ichikawa (JP); Susumu Inamura, Utsunomiya (JP); Shinichi Sato, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 09/921,586

(22) Filed: Aug. 6, 2001

(65) Prior Publication Data

US 2002/0017763 A1 Feb. 14, 2002

(30) Foreign Application Priority Data

Aug. 7, 2000 (JP) .......................................... 2000-238773

(51) Int. Cl.[7] ................................................ F02F 11/00
(52) U.S. Cl. ........................ 277/592; 277/594; 277/595; 277/593
(58) Field of Search ............................... 277/592, 593, 277/594, 595

(56) References Cited

U.S. PATENT DOCUMENTS

| | | | |
|---|---|---|---|
| 5,150,910 A | * 9/1992 | Udagawa | 277/235 |
| 5,582,415 A | * 12/1996 | Yoshida et al. | 277/235 |
| 5,695,203 A | 12/1997 | Udagawa | |
| 6,145,847 A | * 11/2000 | Maeda et al. | 277/593 |
| 6,478,307 B2 | * 11/2002 | Sugimoto et al. | 277/592 |

FOREIGN PATENT DOCUMENTS

| | | |
|---|---|---|
| DE | 36 43 281 | 7/1988 |
| EP | 0 126 233 | 11/1984 |
| EP | 0 853 204 | 7/1998 |
| EP | 0 866 245 | 9/1998 |
| EP | 0 866 246 | 9/1998 |
| EP | 0 921 333 | 6/1999 |

OTHER PUBLICATIONS

Patent Abstracts of Japan, vol. 1997, No. 12, Dec. 25, 1997 (Nippon Reinz Co., Ltd.) Aug. 12, 1997.

* cited by examiner

Primary Examiner—Anthony Knight
Assistant Examiner—Lisa Bannapradist
(74) Attorney, Agent, or Firm—Kanesaka & Takeuchi

(57) ABSTRACT

A cylinder head gasket for an internal combustion engine is formed of one metal plate having a base portion extending substantially throughout an entire area to be sealed, a hole formed in the base portion corresponding to the hole of the engine, and a bead surrounding the hole. A resin coating is deposited on at least a part of the bead of the metal plate. Thus, the bead is reinforced and sealing ability is improved.

7 Claims, 3 Drawing Sheets

CYLINDER HEAD GASKET WITH PARTIAL RESIN COATING

BACKGROUND OF THE INVENTION AND RELATED ART STATEMENT

The present invention relates to a cylinder head gasket formed of one metal plate and provided with a partial resin coating around a hole to be sealed.

A cylinder head gasket for sealing between a cylinder head and a cylinder block generally includes holes for cylinder bores, oil holes, water holes, and bolt holes. Also, in order to seal combustion gases generated in the combustion chambers, oil circulating through an oil gallery and water in a water jacket, the gasket includes sealing means, such as beads and seal rings, for providing adequate sealing pressures for the respective holes to be sealed.

Especially, since high temperature and high pressure combustion gases are generated in the holes for the cylinder bores when the engine is operated, sealing around the holes for the cylinder bores is especially important. Therefore, a metal plate superior in mechanical strength and durability is used, and for example, a plurality of metal plates is laminated, and beads are arranged around the holes for the cylinder bores to provide high sealing pressures by the beads.

Also, in order to protect creep relaxation of the beads and increase the surface pressures around the holes for the cylinder bores, various methods are taken. For example, a second metal plate with a stopper bead inside or outside the bead is arranged, a stopper as a metal shim is disposed, or a plate having a half bead or full bead is combined.

On the other hand, recently, a head gasket is required to manufacture at a low cost. If the gasket is formed of a plurality of metal plates, it can not respond to a cost reducing demand. Thus, it has been considered to use a gasket formed of one metal plate.

However, in the head gasket formed of one metal plate, a plurality of sealing means can not be combined, as used in the gasket formed of a plurality of metal plates, and sealing means is limited. Therefore, in the head gasket requiring high sealing ability and durability, it is difficult to provide secure sealing.

For this purpose, it is considered to install a reinforcing shim made of metal, provide a grommet or increase the thickness by thermal spraying around a hole for the cylinder bore. If these processings are made, the manufacturing steps and raw materials are increased to increase the cost. Thus, these processings are required to be deleted.

On the other hand, the engine has been made light, so that the cylinder head and the cylinder block are formed of relatively soft aluminum alloy. Therefore, in case a cylinder head gasket is disposed between the cylinder head and the cylinder block, and is tightened strongly to keep the sealing ability, when the engine vibrates and a thermal expansion is applied, the cylinder block and cylinder head may be damaged by the gasket. The combustion gas may leak through the damaged portion.

In case the contact of the bead of the gasket with the engine parts, such as cylinder head, is a direct metal contact, a small space or gap is formed by the projections and dents due to a tool mark on the surface of the engine parts, vibration of the engine or thermal changes of the gasket and the engine parts. Combustion gas with high temperature and pressure may leak through the small space or gap.

If the combustion gas with high temperature and pressure leaks, the combustion gas is likely to enter into the oil hole and water hole through the space between the head gasket and the engine part. When the combustion gas enters the oil hole and water hole to cause air inclusion, it causes a trouble in circulation of oil and water, leading to a serious engine trouble. It is, therefore, important to prevent the leakage of the combustion gas.

The present invention has been made to obviate these problems, and an object of the invention is to provide a cylinder head gasket formed of one metal plate, which can provide a sufficient sealing ability.

Another object of the invention is to provide a cylinder head gasket as stated above, wherein the gasket does not hurt the cylinder head and the cylinder block.

Further objects and advantages of the invention will be apparent from the following description of the invention.

SUMMARY OF THE INVENTION

A cylinder head gasket for an internal combustion engine of the invention is formed of one metal plate having a base portion extending substantially throughout an entire area to be sealed, a hole formed in the base portion corresponding to a hole of the engine, and a bead surrounding the hole. A resin coating is deposited on at least a part of the bead of the metal plate on a projection side and/or a recess side. The resin coating may be applied to cover the entire bead on at least one of the projection side and the recess side of the bead.

The resin coating may have, according to the object of regulating the surface pressure, an equal thickness or unequal thickness. In case of the unequal thickness, the resin coating may have one layer with different thicknesses, or have a plurality of layers so that the thickness is changed by the number of the layers.

In the cylinder head gasket, the resin coating is formed to at least cover a part of the bead to have a function of reinforcing the bead. In addition, since the resin coating which is softer than a metal shim and harder than a rubber coating exhibits the sealing ability, the sealing ability of the gasket with respect to a cylinder head and a cylinder block is improved. Since the resin coating operates as an absorbing material, the damage and creep relaxation of the bead are protected, and the durability of the gasket is improved.

In case the resin coating is applied to both ends of the bead while covering the bead, since the step portions of the resin coating at both ends thereof form second and third seal lines, the sealing ability for the combustion gas is further improved.

Incidentally, it is difficult to fix a metal shim to cover a main bead with a projection, and a thermal sprayed shim is not good for accurate processing and is expensive. Even if the thermal sprayed shim is formed accurately, since metal is harder than the resin, it can not provide good sealing ability. Also, the shim can not operate as an absorbing material.

Also, in case a material, such as gum layer softer than the resin is used, the material may flow or break in use by pressure. Therefore, it can not provide the sealing function nor absorbing ability like the resin. Also, since a soft material can not provide a step because of its softness, the second and third sealing lines can not be formed inside and outside the bead.

In the above gasket, the resin coating has the hardness of F to 6H in pencil hardness. If the resin coating is softer than F in pencil hardness, the resin coating may flow or break by the pressure applied thereto. If the resin layer is harder than 6H in pencil hardness, the sealing and absorbing abilities become bad. Therefore, the resin coating is preferably formed to have the hardness of F to 6H in pencil hardness.

In the gasket of the invention, the resin coating is formed of epoxy resin, phenol resin, phenoxy resin, fluoroplastics and polyamideimido, or combination thereof. Although the resin coating may be formed of various resins, it is preferable to use epoxy resin, phenol resin, phenoxy resin, fluoroplastics, polyamideimido, or combination thereof in view of the hardness and easy application. Especially, the phenoxy resin has heat resistance over 200° C., and in view of working ability and physical characteristics in coating, it is most preferable to use the phenoxy resin.

In the invention, the resin coating is applied by screen printing. Although the resin coating may be applied freely in various shapes by spraying using a mask, the resin coating can be easily formed even in a complicated shape if the screen printing is used. Further, by multiple printings, the resin coating can be formed easily with different thicknesses. Thus, it is possible to easily form the resin coating with adequate thickness according to the position thereof. Also, it is possible to form the resin coating with various shapes and thicknesses, and to have a multiple structure with different materials by the multiple printings.

The gasket may have additional gum coatings on the metal plate with the resin coating to improve affinity with the cylinder head and the cylinder block.

DETAILED DESCRIPTION OF THE DRAWINGS

Now, the specific embodiments of the invention will be explained with reference to the drawings.

Figure 1:
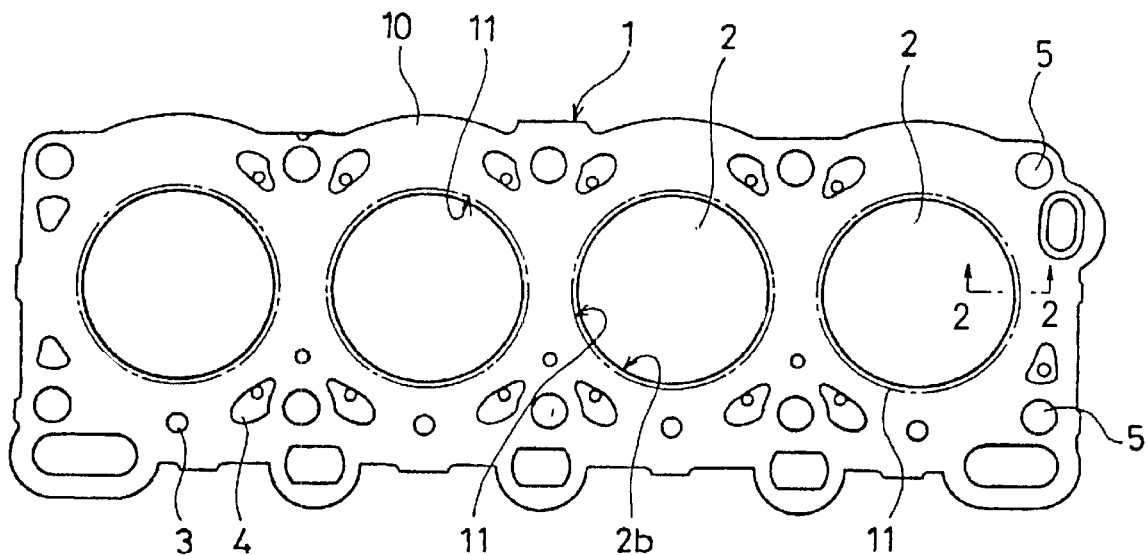
FIG. 1 is a plan view of a first embodiment of a cylinder head gasket of the invention.

As shown in FIG. 1, a cylinder head gasket 1 is designed to seal between a cylinder head and a cylinder block (both not shown), and is structured by one metal plate 10 made of metal superior in mechanical strength and durability. The gasket 1 includes holes, such as holes 2 for cylinder bores, oil holes 3, water waters 4, bolt holes 5, and so on.

As the material for the metal plate 10, hard metal, such as soft steel plate, stainless steel plate and spring plate, or ductile metal, such as copper and aluminum plates, may be used.

In order to seal around the holes 2 for the cylinder bores, beads 11 are formed entirely around peripheries 2b of the holes 2 for the cylinder bores to generate high sealing surface pressures to thereby form main seal portions as first seal lines A. The bead 11 includes a top portion 11a, two side portions 11b located on two sides of the top portion, and two bottom portions 11c extending from a base of the metal plate 10 to the two side portions.

In order to reinforce and strengthen the bead 11, a resin coating 20, i.e. 20a–20f, is formed on at least one side of the projection side and a recess side of the bead 11 to at least partly cover the bead 11, or to completely cover the bead 11 including both ends. The resin coating is formed around the bead 11 to have an annular shape with a hole therein.

Figure 2:
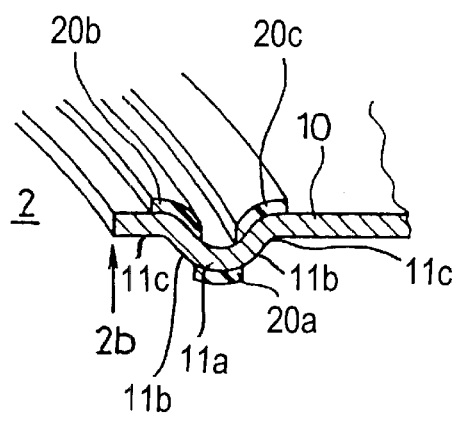
FIG. 2 is an enlarged sectional view taken along line 2—2 in FIG. 1.
Figure 3:
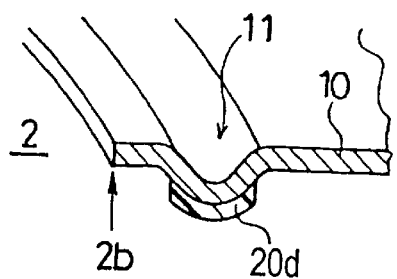
FIG. 3 is a sectional view, similar to FIG. 2, of a second embodiment of the invention.
Figure 4:
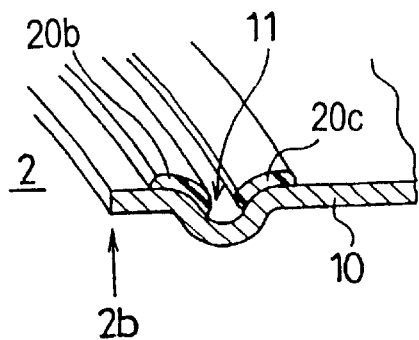
FIG. 4 is a sectional view, similar to FIG. 2, of a third embodiment of the invention.

In FIG. 2, a resin coating 20a is formed on the top portion at the projection side, and resin coatings 20b, 20c are formed on the bottom portions 11c at the recess side. In FIG. 3, a resin coating 20d is formed on the top portion to extend to the two side portions at the projection side. In FIG. 4, the resin coatings 20b, 20c are formed only on the bottom portions at the recess side.

Figure 5:
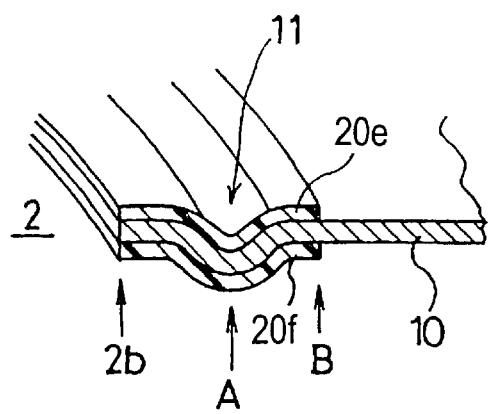
FIG. 5 is a sectional view, similar to FIG. 2, of a fourth embodiment of the invention.
Figure 6:
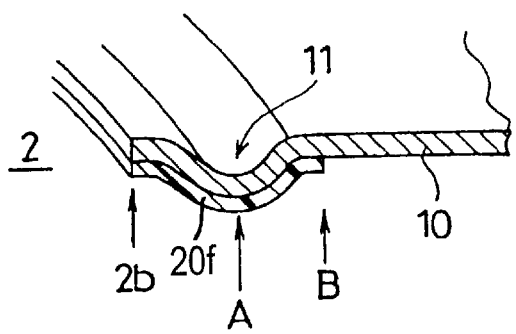
FIG. 6 is a sectional view, similar to FIG. 2 of a fifth embodiment of the invention.
Figure 7:
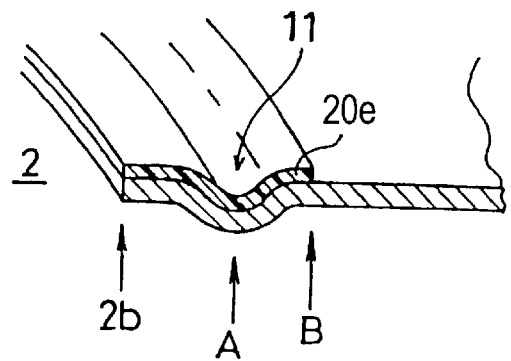
FIG. 7 is a sectional view, similar to FIG. 2, of a sixth embodiment of the invention.

In FIG. 5, resin coatings 20e, 20f completely cover the bead on the projection side and the recess side. In FIG. 6, a resin coating 20f covers the bead on the projection side, and in FIG. 7, a resin coating 20e covers the bead on the recess side.

The resin coating 20 has a hardness of F-6H in pencil hardness such that when the resin layer is compressed, the resin layer is deformed, but not damaged, and is formed of epoxy resin, phenol resin, phenoxy resin, fluoroplastics or polyamideimido, which is applied by screen printing. In view of working ability and physical characteristics of the coating, phenoxy resin may be preferably used.

As an example, though it depends on the size and kind of the engine, in case the diameter of the hole 2 is 80 mm and the thickness of the metal plate 10 is 150–500 $\mu$m, the thickness of the resin coating 20 is 5–150 $\mu$m. Especially, the thickness at the recess portion is 10–250 $\mu$m.

As an example, though it depends on the size and kind of the engine, in case the diameter of the hole 2 is 80 mm and the metal plate 10 is 150–500 $\mu$m, the thickness of the resin coating 20 is 5–150 $\mu$m. Especially, the thickness at the recess portion is 10–250 $\mu$m.

Figure 8:
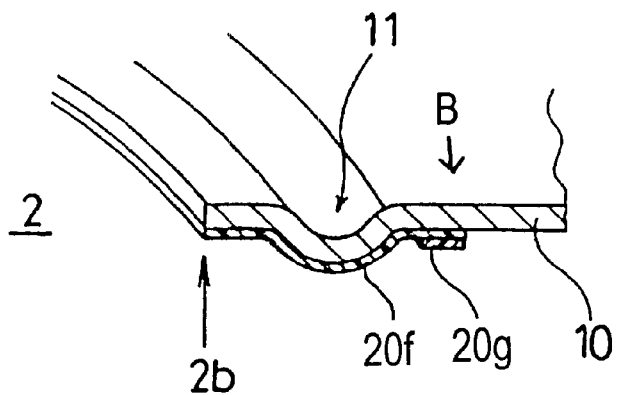
FIG. 8 is a sectional view, similar to FIG. 2, of a seventh embodiment of the invention.

The resin coating 20 need not have equal thickness, and may have different thicknesses according to the necessity. For example, as shown in FIG. 8, the resin coating is formed of multiple coatings 20f, 20g such that the two coatings are formed on the outer side of the bead 11 to form a large step portion. Accordingly, a sealing surface pressure at a seal line B formed by the step portion is increased.

In regard to the ends of the resin coating 20, the inner end may be aligned with the end of the hole 2 for the cylinder bore, or may be disposed outside the end of the hole 2. In case a plurality of resin coatings is formed, the outer coating 20g may be aligned with the edge of the lower coating 20f or located away from the edge of the lower coating stepwisely.

In case the resin coatings are formed on both projection side and recess side, when the ends at the projection side and recess side are aligned, the thicknesses at the steps are increased to increase the sealing surface pressure. The ends of the resin coatings need not be aligned according to the required sealing surface pressure and the number of the seal lines. The width, location and thickness of the resin coating 20 are determined according to the surface pressure distribution required for each head gasket.

In regard to the sealing of oil circulating through the oil gallery and water of the water jacket, sealing means, such as full bead and half bead, for forming appropriate sealing pressures may be formed around oil holes 3 and water holes 4 to be sealed.

Figure 9:
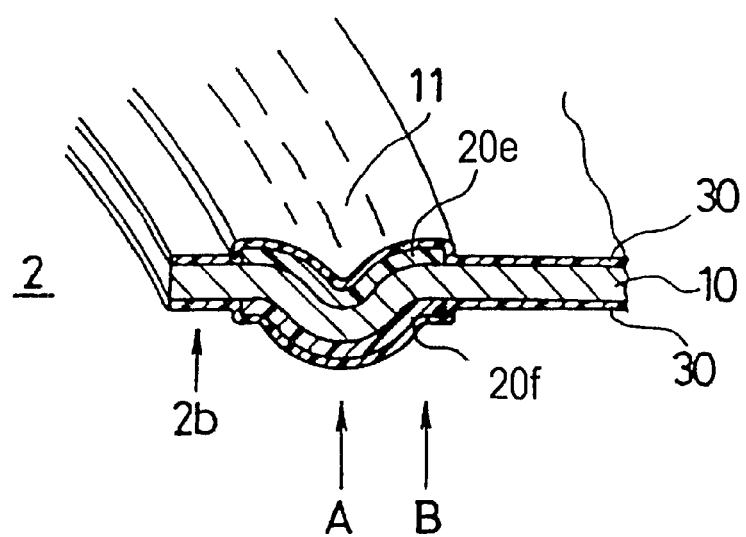
FIG. 9 is a sectional view, similar to FIG. 2, of an eighth embodiment of the invention.

Also, as required, as shown in FIG. 9, after the resin coatings 20, i.e. 20e, 20f, are formed, surface coatings 30 may be applied on the entire surfaces of the gasket 1. As the surface coating, it is preferable to have good durability and heatproof property relative to the combustion gas and liquid, i.e. oil and water, to be sealed, and also have softness and recovery ability for the compressing deformation. The material may be a rubber type material, such as NBR gum, fluorine rubber, silicone rubber, hydrogen added nitrilebutadiene rubber.

In case the rubber type material is used, since the material has resiliency, a tool mark and so on formed on the cylinder head and the cylinder block can be absorbed.

In the gasket 1 as stated above, the gasket 1 is formed of one metal plate 10, and the sealing is made by the bead 11 and resin coating 20. Thus, the gasket can be manufactured at a low cost.

Since the resin coating 20 is formed to at least cover a part of the bead 11 formed on the metal plate 10, the bead 11 is reinforced. Also, since the sealing effect of the resin coating 20, which is softer than a metal shim and harder than a rubber coating, is utilized, the sealing ability can be improved. Also, the damage of the cylinder head and the cylinder block to which the gasket abuts can be prevented.

In case the resin coating 20 is applied to entirely cover the bead 11 up to the ends of the bead 11, a second seal line B and so on may be formed outside the bead 11 by the step portion at the end of the resin coating 20 covering the bead 11. Thus, the sealing ability for the combustion gas can be further improved.

Also, the resin coating 20 can be formed easily by screen printing or spraying using a mask. Thus, the management of the material and processing can be easily made, so that the increase of the manufacturing steps and the cost is small.

While the invention has been explained with reference to the specific embodiments of the invention, the explanation is illustrative, and the invention is limited only by the appended claims.

What is claimed is:

1. A cylinder head gasket for an internal combustion engine having a hole to be sealed, comprising:

a metal plate having a base portion extending substantially throughout an entire area to be sealed, a hole formed in the base portion corresponding to the hole of the engine, and a bead surrounding the hole and having a top portion contigous with a top portion of the plate, two side portions located on two sides of the plate, and two bottom portions extending from the respective side portions to the base portion, and a resin coating deposited on the bead of the metal plate and including a top coating section deposited on only the top portion and parts of the two side portions on a projection side of the bead without extending to the two bottom portions, and two bottom coating sections spaced apart from each other and deposited on only the two bottom portions extending from the respective side portions to the base portion at a recess side of the bead so that said one bead is covered by the top coating section and the two bottom coating sections spaced apart from each other.

2. A cylinder head gasket according to claim 1, wherein said resin coating has heatproof and compressibility characteristics.

3. A cylinder head gasket according to claim 1, wherein said resin coating has a hardness of F to 6H in pencil hardness.

4. A cylinder head gasket according to claim 1, wherein said resin coating is selected from the group consisting of epoxy resin, phenol resin, phenoxy resin, fluoroplastics and polyamideimido.

5. A cylinder head gasket for an internal combustion engine having a hole to be sealed, comprising:

a metal plate having a base portion extending substantially throughout an entire area to be sealed, a hole formed in the base portion corresponding to the hole of the engine, and a bead surrounding the hole and having a top portion, two side portions located on two sides of the top portion, and two bottom portions extending from the respective side portions to the base portion, and a resin coating deposited on the bead of the metal plate and having two bottom coating sections spaced apart from each other and deposited on the two bottom portions extending from the respective side portions to the base portion at a recess side of the bead so that said one bead is covered by the two bottom coating sections.

6. A cylinder head gasket according to claim 3, further comprising a space between the two bottom coating sections on the recess side opposite to the top portion.

7. A cylinder head gasket according to claim 1, further comprising a space between the two bottom coating sections on the recess side opposite to the top portion.

* * * * *

UNITED STATES PATENT AND TRADEMARK OFFICE
CERTIFICATE OF CORRECTION

PATENT NO. : 6,517,085 B2
DATED : February 11, 2003
INVENTOR(S) : Tsunekazu Udagawa et al.

It is certified that error appears in the above-identified patent and that said Letters Patent is hereby corrected as shown below:

Column 3,
Line 61, change "waters" to -- holes --;

Column 4,
Lines 37 and 38, delete in its entirety;
Lines 39, 40 and 41, delete in its entirety;

Column 6,
Line 1, change "contigous" to -- contiguous --;
Line 2, change "plate" to -- bead top portion --;
Line 7, before "top", add -- bead --;
Line 14, before "spaced", add -- are --;
Line 32, before comma, add -- contiguous with a top portion of the plate --;
Line 33, before "top", add -- bead --; and
Line 42, change "3" to -- 5 --.

Signed and Sealed this

First Day of July, 2003

JAMES E. ROGAN
*Director of the United States Patent and Trademark Office*